United States Patent
Champion et al.

[11] 3,921,821
[45] Nov. 25, 1975

[54] COUNT INTERVAL SAMPLING MECHANISM

[75] Inventors: Robert J. Champion; Ronald K. Palm; Jesse P. T. Harris, Jr., all of Greenville; William D. Kivett, Taylors, all of S.C.

[73] Assignee: Engineering Development Associates Incorporated, Taylors, S.C.

[22] Filed: Mar. 27, 1974

[21] Appl. No.: 455,140

[52] U.S. Cl. ............ 214/1 BH; 73/421 B; 73/423 R
[51] Int. Cl.² .......... B65G 47/57; B25J 15/06; G01N 1/04
[58] Field of Search ........ 73/41, 45, 421 B, 421 R, 73/424, 423 R, 425, 425.2; 214/1 BH, 650 SG, 1 BS

[56] References Cited
UNITED STATES PATENTS

| | | | |
|---|---|---|---|
| 1,062,636 | 5/1913 | Clift | 73/424 X |
| 2,380,306 | 7/1945 | Hallowell, Jr. | 214/1 BH X |
| 2,601,785 | 7/1952 | Pottle | 73/421 R |
| 2,800,226 | 7/1957 | Drennan | 214/1 BH |
| 2,915,201 | 12/1959 | Calehuff et al. | 214/1 BH |
| 3,834,555 | 9/1974 | Bennington et al. | 214/1 BH X |

FOREIGN PATENTS OR APPLICATIONS

| | | | |
|---|---|---|---|
| 707,875 | 4/1954 | United Kingdom | 73/421 |

Primary Examiner—Richard C. Queisser
Assistant Examiner—John S. Appleman
Attorney, Agent, or Firm—B. P. Fishburne, Jr.

[57] ABSTRACT

A mechanical system with electronic controls provides a means for extracting samples from both sides of a dual production stream of small objects, such as pharmaceutical tablets, on a count interval basis. Alternately operating suction pick-up units carried by transport arms deliver primary and secondary samples of objects from the production stream to a coordinated sample delivery means leading to primary and secondary sample collection containers. Two-level sampling is provided whereby one primary sample and a selected number of secondary samples are extracted from a predetermined total object count. Sampling from the dual production streams of objects in alternating sequence generates samples which are statistically representative of total production.

8 Claims, 11 Drawing Figures

FIG. 8
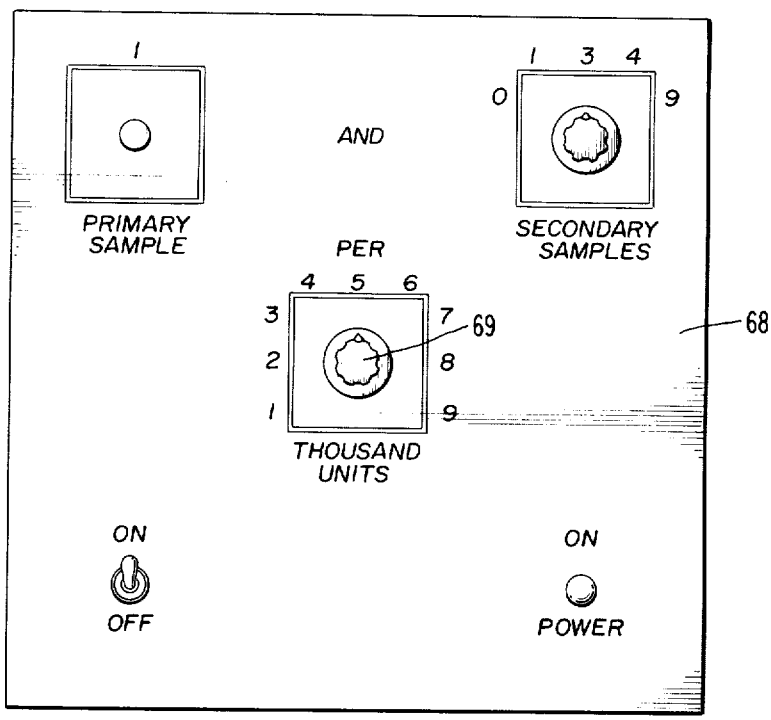
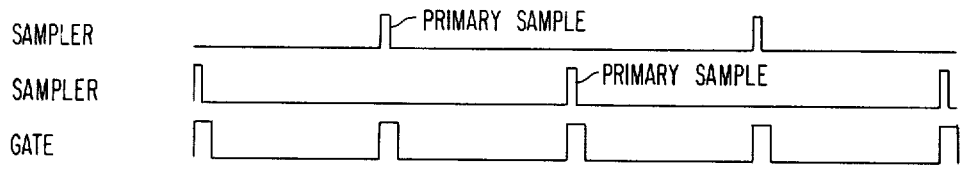
FIG. 10
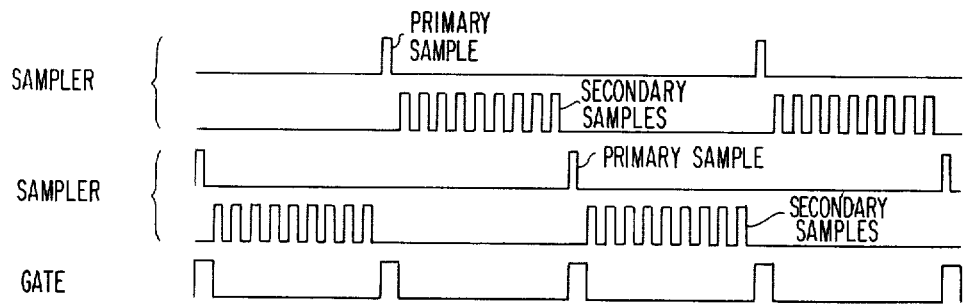
FIG. 11

COUNT INTERVAL SAMPLING MECHANISM

BACKGROUND OF THE INVENTION

A need exists in the pharmaceutical industry and elsewhere for a reliable, simplified and economical product sampler which is readily adaptable to existing production machinery, such as a rotary action pharmaceutical tablet press with dual output streams of tablets. The invention herein is described in connection with such a machine but it should be understood that the invention is also adaptable to other like applications.

At the present time, hand sampling of mass-produced small objects is commonly resorted to along with certain other relatively haphazard arrangements for gathering representative samples. Such practices are neither economical nor reliable, and hence the need for a satisfactory apparatus for this purpose. To properly satisfy the need, the apparatus must be capable of furnishing statistically representative collections of both primary and secondary samples and must be capable of taking equal sample quantities from each of the two production streams. The primary/secondary sample ratio, as well as the sample interval, must be easily changeable. The apparatus must be adaptable to a variety of product sizes and shapes and must furnish reliable, high speed object sampling in harsh environments.

With the above background in view, the present invention is thought to provide a sampling mechanism which will completely satisfy the needs of the art, both in terms of economics and reliability of operation. The mechanism of the invention embodies simplified mechanical components and electronic controls which render the device automatic in a repetitive cycle of operation with adequate adjustabilty of crucial components of the system. The mechanism utilizes a unique vacuum pick-up unit for transporting objects from the production streams to the funnels of a delivery system leading to primary and secondary sample collection containers. A coordinated gating means assures delivery of the primary and secondary object samples to the proper sample containers.

Other objects and advantages of the invention will become apparent during the course of the following description.

BRIEF DESCRIPTION OF DRAWING FIGURES

FIG. 8 is a side elevation showing the face of a control unit.

FIGS. 10 and 11 are sequence charts representing the relationships of primary and secondary samples for particular switch settings.

DETAILED DESCRIPTION

Figure 1:
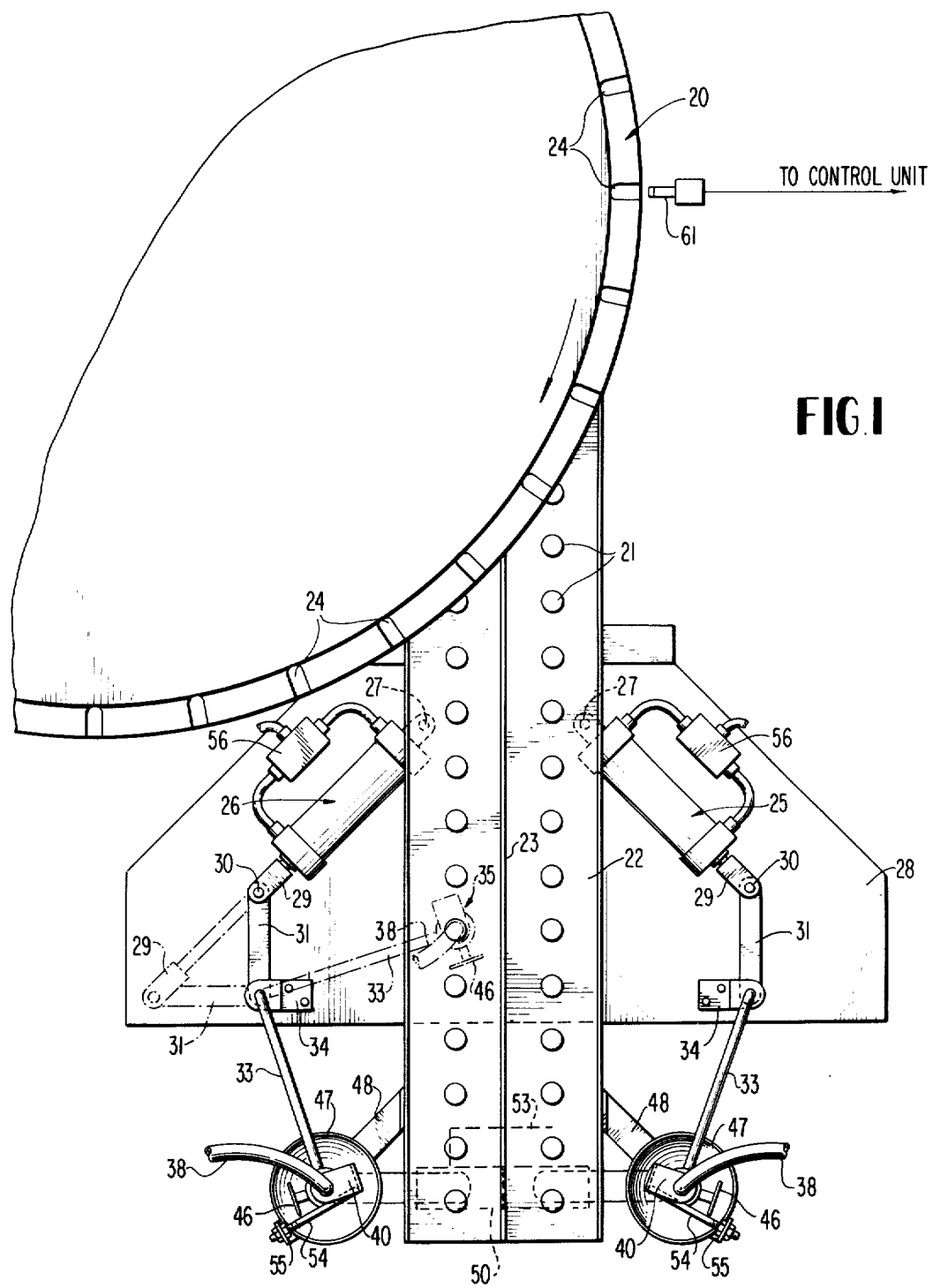
FIG. 1 is a plan view of the invention applied to a rotary action tablet press with dual stream output.
Figure 2:
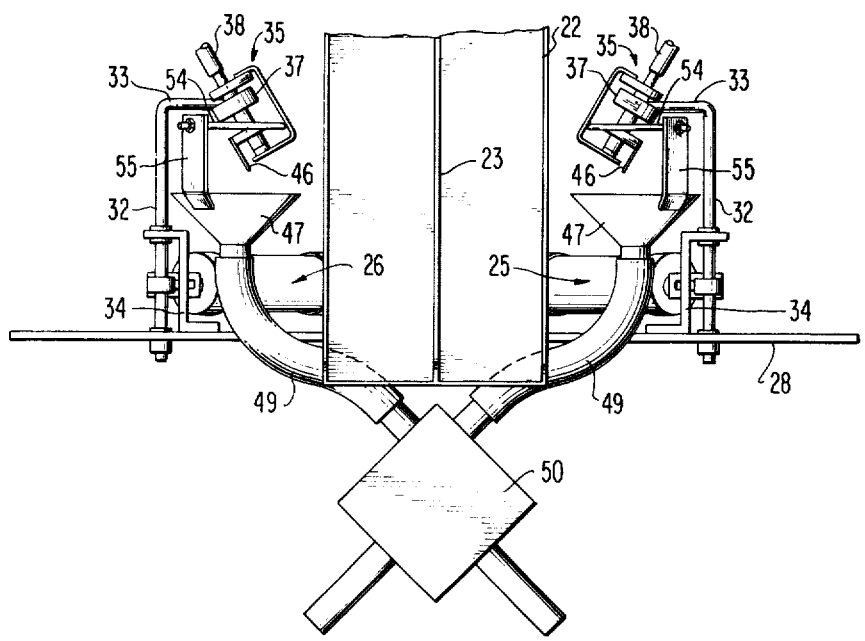
FIG. 2 is a fragmentary side elevational view of the invention.
Figure 3:
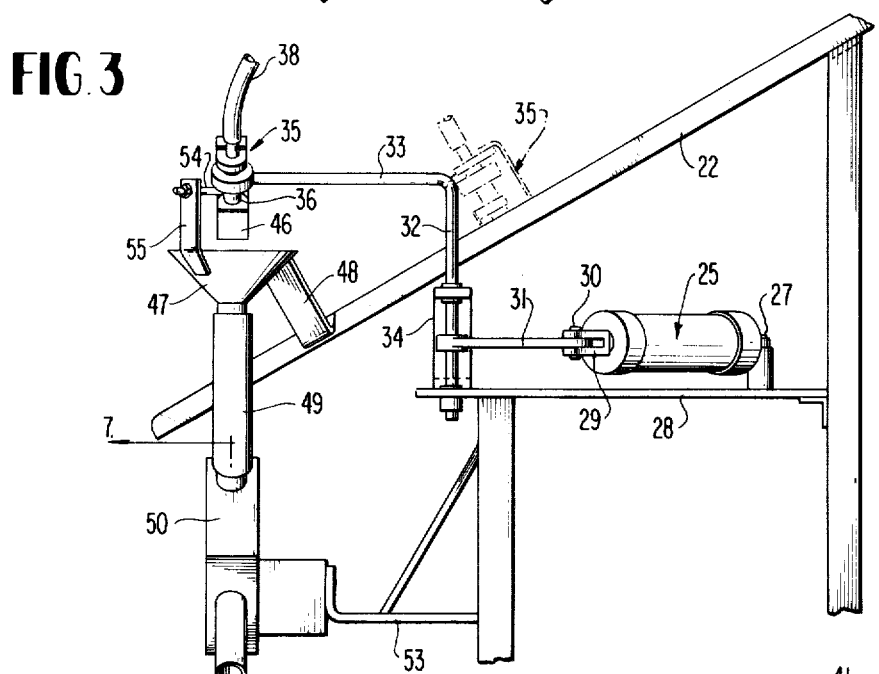
FIG. 3 is an additional side elevation taken at right angles to FIG. 2.
Figure 6:
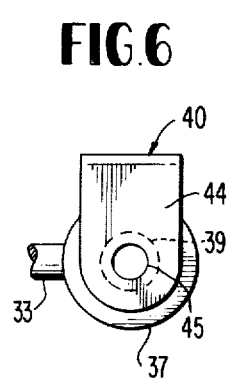
FIG. 6 is a fragmentary bottom plan view of the suction pick-up unit.

Referring to the drawings in detail wherein like numerals designate like parts, the numeral 20 designates a conventional rotary tablet press used for the production of pharmaceutical tablets 21 which are discharged onto an inclined production tray 22 in two separate production streams, as depicted in FIG. 1. The tray 22, which has a suitable stream divider 23, is a part of the production machine to which the invention proper is attached. The tablet press 20 which revolves in the direction of the arrow has multiple circumferentially spaced cavities 24 corresponding to the objects produced by the machine, such objects or tablets 21 being automatically delivered at the proper times to the tray 22 in the aforementioned separated production streams. While the invention will be described in terms of the pharmaceutical tablets 21, it will be understood that it is capable of operating with a variety of similar small objects which may differ in size and shape, and the invention may be utilized with different types of small objects producing machines with only minor modification and no change in its basic construction or operational principle.

The product sampling mechanism forming the subject matter of the invention comprises a pair of horizontal pneumatically operated cylinder-piston units 25 and 26 having their cylinder ends attached as at 27 to a horizontal mounting plate 28 fixedly attached at a proper elevation to the framework of the production machine 20. The piston rods 29 of units 25 and 26 are pivotally coupled at 30 to links 31 which are rigidly secured to vertical shaft extensions 32 of transport arms 33 which swing horizontally above the production tray 22. The shaft extensions 32 are journaled in bearing brackets 34, firmly attached to the mounting plate 28 forwardly of the divergent cylinder-piston units 25 and 26.

Figure 4:
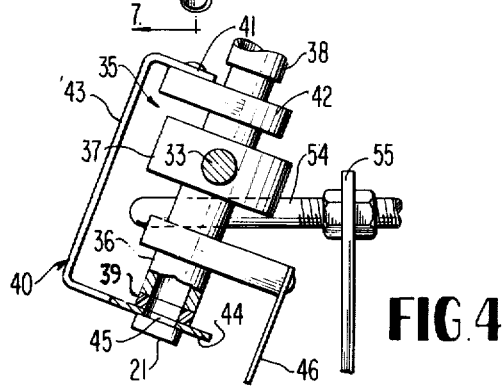
FIG. 4 is a side elevational view, partly in section, of a suction pick-up unit and suction shut-off means in the active object carrying position.
Figure 5:
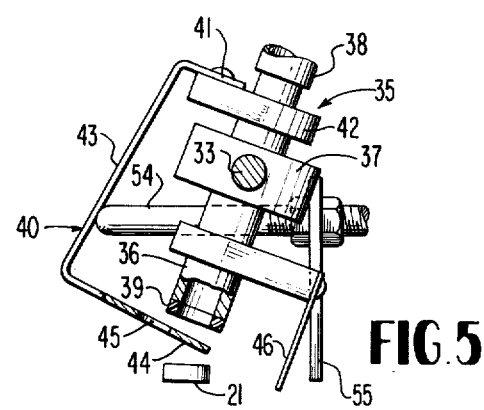
FIG. 5 is a similar view of the suction unit and shut-off means in the object releasing position.

The transport arms 33 carry at their free ends vacuum operated object pick-up units 35 which serve to pick up one and only one tablet 21 at a time from the production streams moving down the tray 22 and to transport such sample tablets to a coordinated sample delivery system, yet to be described. Each pick-up unit 35 comprises a rigid tube body 36 fixedly secured through a collar 37 near its longitudinal center to one of the transport arms 33. Corresponding ends of the tube bodies 36 are connected by flexible hoses 38 to a suitable source of vacuum 38' at a remote point. At their lower ends, the tube bodies 36 carry vacuum nozzle tips 39 preferably in the form of resilient rings suitably secured to the tube bodies with their bores registering with the tube body bores. Suction shut-off valve elements in the form of generally L-shaped springs 40 are provided on the units 35 as best shown in FIGS. 4 and 5. Each spring valve element 40 has an upper extension 41 fixedly attached to a lug 42 on the tube body 36, a vertical arm 43 which parallels the tube body when the spring is relaxed, FIG. 4, and a lower end flat valve plate 44 which slidably contacts the nozzle element 39 and has an aperture or port 45 registering with the bore of element 39 when the spring is relaxed, FIG. 4. When the spring valve element 40 is deformed, as shown in FIG. 5, by means to be described, the aperture 45 will move out of registration with the bore of nozzle tip 39 and the suction through the unit will be shut off by the solid portion of the valve plate 44, whereby the tablet 21, previously held by suction, will be released.

Each vacuum pick-up unit 35 carries a flexible flap 46 formed of rubber or the like and extending somewhat below the pick-up unit as shown. The purpose of this flap is to engage the tablets 21 in one of the production streams moving down the tray 22 and to hold back the stream momentarily so that the tablets 21 will pile up behind the flap. This enables a single tablet to be more easily captured and picked up by the unit 35 when the same is positioned over the tray 22 with the associated transport arm 33, as shown in broken lines in FIG. 1. The flap 46, being flexible, will not damage the tray 22 or crush one of the fragile objects 21 should an object be directly beneath the flap as the unit 35 moves into the pick-up or capture position above the tray.

The mechanism further embodies a delivery system for conveying captured samples from the two production streams to suitable sample containers, not shown, for primary and secondary samples. This delivery system or means comprises a pair of sample receivers 47 in the form of funnels attached fixedly to the tray 22 by bracket means 48. The funnels 47 have sample conveyor hoses 49 connected therewith for delivering samples captured from the two streams on the tray 22 to a sample separator chamber 50 where the samples are diverted by a movable gate element 51 into either one of two delivery tubes 52 leading to the separate containers for primary and secondary samples. The sample separator chamber 50 is fixedly secured to the frame of the production machine by additional bracketing means 53.

In order to effect the release of the sample tablets 21 lifted and transported by the two units 35 from the dual production streams when the units are directly over the funnels 47, adjustable rigid contact pins 54 are secured by threaded adjusting means to support brackets 55 fixedly attached to the two funnels. As shown in FIGS. 1 and 5, when the transport arms 33 move the units 35 over the sample receiver funnels, the arms 43 of spring valve elements 40 engage the fixed pins 54 and the spring valve elements yield during slight continued movement of the arms 33 to assume the suction cut-off or disabling position shown in FIG. 5. When this occurs, the suction held tablet 21 will be instantly dropped to fall by gravity into the particular receiver funnel 47.

Figure 9:
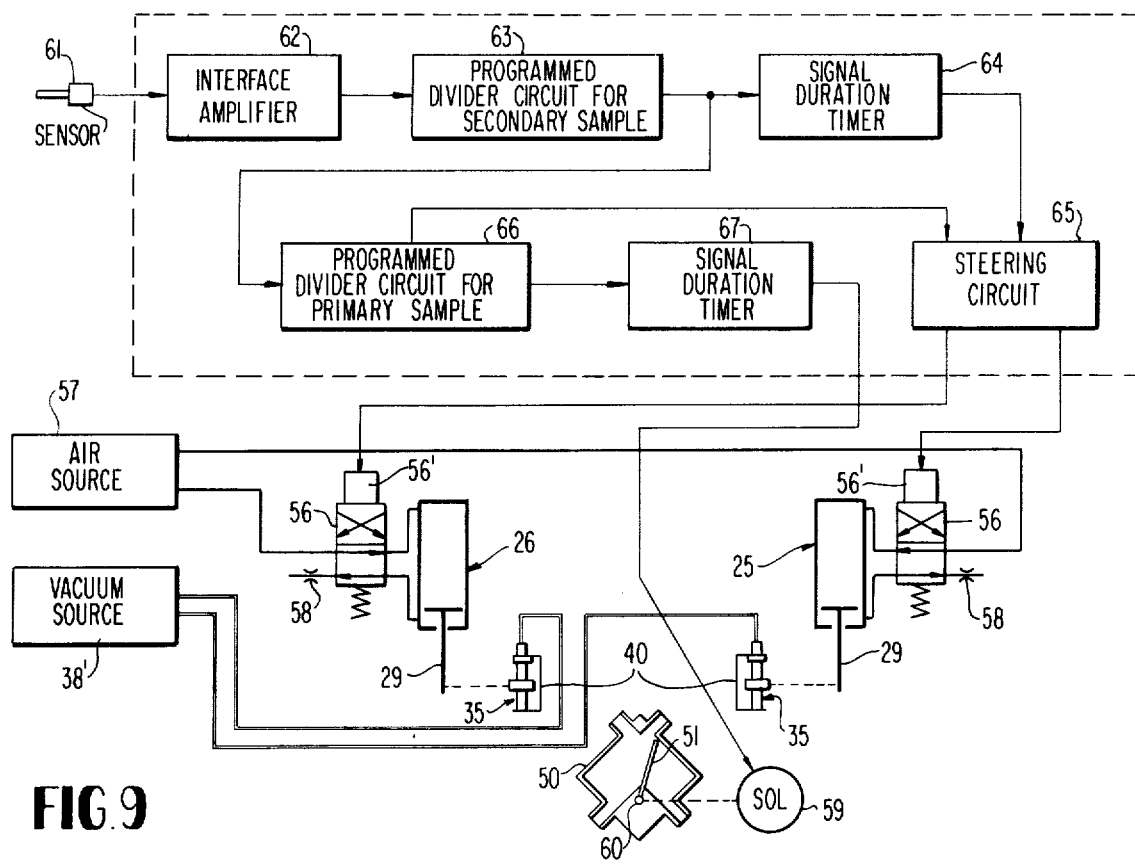
FIG. 9 is a schematic of the electronic control system for the invention in block diagram form.

Continuing to refer to the drawings, the two cylinder-piston units 25 and 26 which activate the transport arms 33 are controlled by four-way solenoid-operated valves 56 having solenoids 56' as shown in FIG. 9. These valves in proper sequence allow compressed air from a suitable source 57, including regulator means, to move the piston rods 29 and transport arms 33 to one of their two positions relative to the tray 22 in an alternating cycle of operation, to be further described. Restricting orifices 58 are placed in the air lines controlling the movement of the transport arms 33 toward the funnels 47. This allows reduced velocity of the return-to-discharge movement of the arms which promotes stable object transport and release into the funnels of the delivery system. In the other direction of movement to the pick-up positions directly over the tray 22, the transport arms are driven rapidly by the units 25 and 26.

Figure 7:
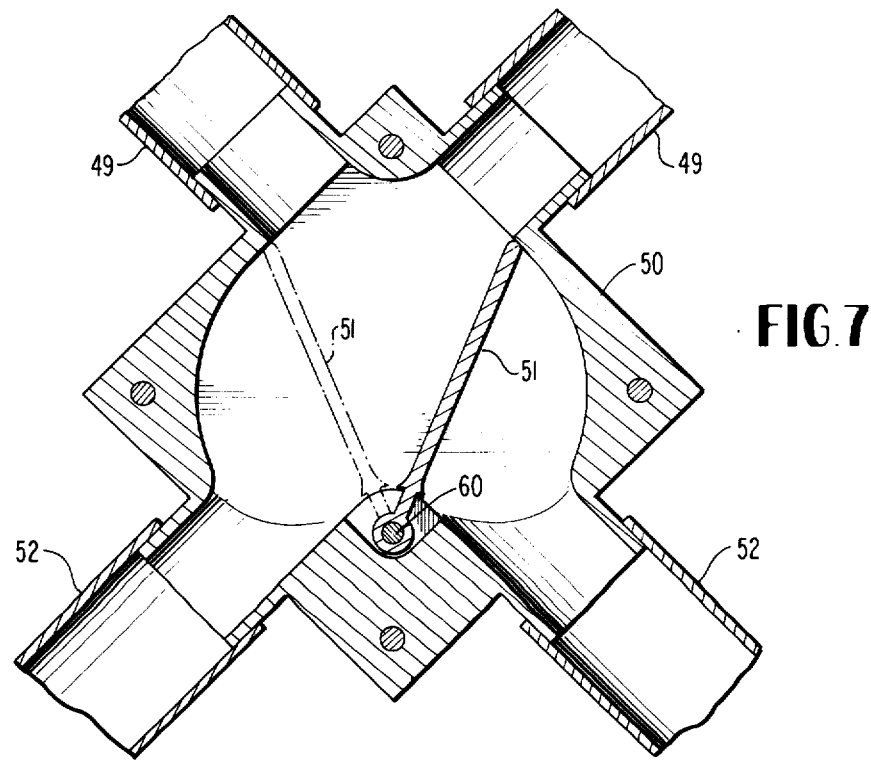
FIG. 7 is an enlarged vertical section taken on line 7—7 of FIG. 3.

Referring to FIGS. 7 and 9, the pivoted gate element 51 in separator chamber 50 is operated by a spring-return rotary solenoid 59 which is mechanically coupled to the rocker shaft 60 of the gate element. The gate element is arranged to completely block the entry of samples into one delivery tube 52 when the solenoid 59 is de-energized, as shown by the full line position of the element 51 in FIG. 7. When the solenoid is energized, the gate element 51 is moved to the dotted line position to block the other exit or delivery tube 52. Thus, a sample tablet falling from either funnel 47 is steered to either a primary or secondary sample collection container through one of the tubes 52.

A conventional metal sensing probe 61 and interface amplifier 62 are used to sense the occurrence of individual object or tablet production by detecting the passage by the probe of corresponding metal discontinuities caused by the provision of the recesses 24 in the production machine. The electronic control system for the mechanism shown schematically in FIG. 9 could, if desired, embody direct object sensing by an electro-optical sensor rather than the disclosed metal sensing probe. In the disclosed controls, output electrical pulses representative of tablet production are coupled to an electronic counter means.

More particularly, a secondary sample counter 63 has a switch-selectable division ratio which produces an electrical output after a selected number of input pulses. This signal is coupled to a timer 64 to produce a controlled-duration signal. This controlled-duration signal passes through an electronic steering circuit 65 to one or the other of the pneumatic cylinder controlling solenoids 56'.

The secondary sample counter output additionally is connected as an input to a primary sample counter circuit 66 as shown in the schematic. The counter 66 has a switch-selectable division ratio which produces a signal output after a selected number of input signal transitions. This output signal is coupled to a second timer 67 which generates a controlled-duration signal of longer duration than that described above for the timer 64. This longer-duration signal is connected to the separator gate solenoid 59.

Control of the steering circuit 65 is derived in the secondary sample counter 63. Proper scaling of division ratios in the counters 63 and 66 allows labeling of switch functions in meaningful terms as depicted on the face 68 of the control system shown in FIG. 8. Action for a combination of switch settings is graphically represented in the sequence charts of FIG. 10 and FIG. 11.

OPERATION

With the mechanical components assembled as described relative to the machine product delivery tray 22 and properly connected to the vacuum and compressed air sources and wired into the electronic controls, the mechanism is ready for use. The sensor probe 61 is positioned relative to the recesses 24 and adjusted for optimum physical separation from these metal discontinuities. Desired sample intervals are selected by the knob 69, FIG. 8, and production of tablets or like small objects is allowed to begin.

After the desired number of tablets 21 has been counted, one transport arm 33 and its pick-up unit 35 moves rapidly over its corresponding product stream on the tray 22. The streamholding flap 46 causes tablets to pile up behind it, and one tablet is easily captured at the suction port 45 of the particular unit 35.

After a dwell time, controlled by the signal duration timer, the arm 33 and the captured single object 21 return relatively slowly to the release position above the associated funnel 47. The previously-described engagement of pin 54 with spring valve element 40 causes vacuum interruption and release of the object 21 into the funnel.

If this particular sample object was destined to be a primary sample (determined by switch selection and object count), a signal would cause the gate element 51 to move to the primary sample position. Such movement would occur simultaneously with the movement of transport arm 33 downwardly toward the tray 22. Because of the longer-timed duration of this gate solenoid signal, the gate element 51 remains in the primary sample position after the arm 33 has returned and released its object 21 into the funnel; the transport arms being controlled by signals of relatively shorter time duration. The gate signal time duration is sufficiently longer so that it remains set until after a released object 21 can gravitate through the separator chamber 50 to the primary sample container. Operation of both transport arms 33 is identical but with control sequences occurring alternately as illustrated in the chart of FIG. 11.

The apparatus operating in the described manner furnishes statistically representative collections of both primary and secondary samples. Equal numbers of samples are taken from each production stream on tray 22. Reliable, high speed object counting is provided even in harsh environments. The various features and advantages of the invention should now be apparent to those skilled in the art without the necessity for further description herein.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. Apparatus for sampling small objects in dual product streams comprising a pair of product receivers fixedly mounted in relation to the dual product streams with one receiver near one side of each product stream, a pair of pivoted sample transport arms mounted near said product streams and adapted to swing between positions directly over said streams and directly over said receivers, a power means connected with each pivoted transport arm to move the arm cyclically between said positions, a suction nozzle object pick-up device carried by each transport arm and having a suction port operable to capture a single sample object from one product stream for delivery by the arm to one sample receiver, a resilient suction cut-off element carried by each suction nozzle and having a port normally in registration with the nozzle suction port, and a fixed substantially rigid contact element on each receiver in the path of movement of said resilient suction cut-off element to shift the latter to a sample release position above the receiver in which the port of the suction cut-off element is separated from the port of said nozzle.

2. The apparatus of claim 1, and a resilient ringlike tip element for each suction nozzle pick-up device, each resilient suction cut-off element comprising a spring arm having a flat extension adapted to abut the resilient tip element with the port of the cut-off element then in registry with the suction port of the nozzle and tip element.

3. The apparatus of claim 2, wherein each product receiver comprises a funnel, and each contact element is a pin secured to the funnel and projecting thereover and spaced somewhat thereabove.

4. The apparatus of claim 1, and a laterally divided inclined product delivery tray on which said dual product streams of small objects slide in one primary direction.

5. The apparatus of claim 4, and a flexible depending product stream arresting flap carried by each suction nozzle pick-up device and projecting below the lower end thereof, said flap adapted to arrest one product stream when the transport arm with which it is associated is over said tray.

6. The apparatus of claim 1, and a primary and a secondary sample separator means connected with said pair of product receivers.

7. A mechanism for sampling small objects in dual product streams on the basis of an object count interval comprising a pair of alternately operable transport arms mounted for oscillatory movement near a product discharge tray on which said dual product streams are moving, a separate power means operatively connected with each transport arm to produce movement thereof toward and away from said product streams at timed intervals, a vacuum pick-up device carried by each transport arm and operable to capture a single small object from one product stream for movement with the arm to a release point away from said stream, a pair of sample receivers one for each transport arm fixedly mounted in spaced relationship to said product streams and including contact elements engageable with movable components of said pick-up devices to cause the latter to release their captured objects into said receivers, a primary and a secondary sample object separator means communicating with the receivers and receiving all the sample objects from both product streams delivered by the receivers and diverting such objects selectively to primary and secondary sample collection points, electrical control means for said mechanism coordinating the operation of said separate power means with the operation of said primary and secondary sample object separator means, and said separate power means comprising a pair of pressure fluid operated cylinder-piston units and a pair of solenoid operated valves controlling the operation of said units in a timed alternating cycle of operation, said separator means including a sample diverter gate and a solenoid coupled with the gate to move it between primary and secondary sample diverting positions, said electrical control means comprising a production object sensor, sensor signal amplifier means, counter circuitry means for primary and secondary object samples, and additional circuitry means electrically coupled to the solenoids of said valves and gate.

8. A mechanism for sampling small objects in accordance with claim 7, and said additional circuitry means including signal duration timers coupled to said counter circuitry means, and a steering circuit electrically coupled to said valve solenoids, said gate solenoid being electrically coupled to one of said timers.

* * * * *